Patented Oct. 9, 1928.

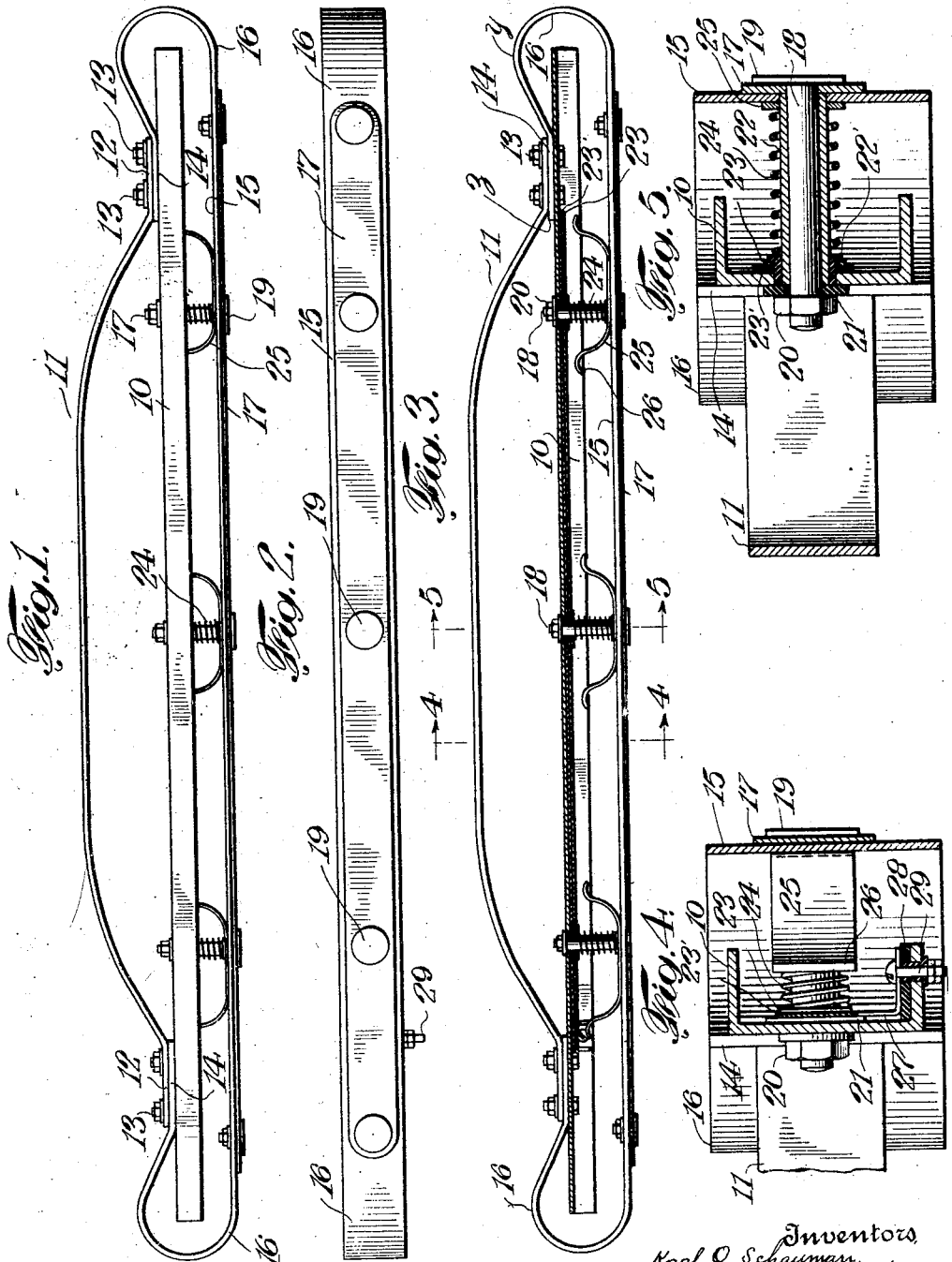

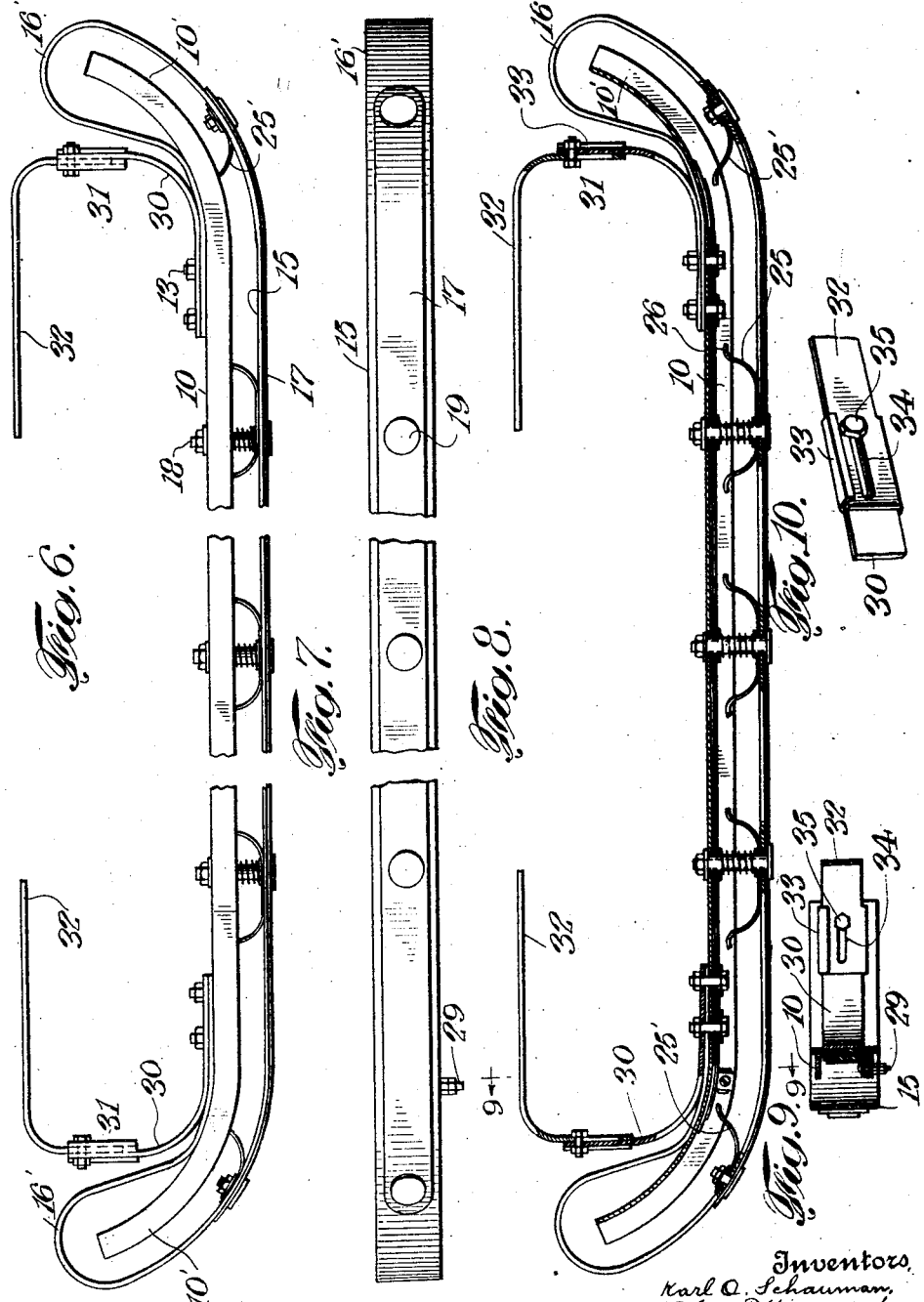

1,686,991

UNITED STATES PATENT OFFICE.

KARL O. SCHAUMAN, STIRLING R. YANCEY, AND JOSE L. MIFSUD, OF NEW YORK, N. Y., ASSIGNORS TO SURE-GUARD CORPORATION, OF NEW YORK, N. Y., A CORPORATION OF NEW YORK.

CAR BUMPER.

Application filed October 11, 1927. Serial No. 225,466.

Our invention relates to improvements in car bumpers, and for convenience of description, we shall refer to it as a bumper for motor cars, but it will be understood from the specification that it can be applied to many other types of vehicles as well as to a conventional motor car. The object of our invention is to produce a simple and efficient bumper which can be conveniently applied to a motor car or the like, and will be held against displacement and yet with sufficient resilience. Our invention is intended to produce a simple, stable structure of this kind which has a bar, preferably of channel iron, forming the base of the bumper, and has a guard running along the outer portion substantially parallel with the base and supported in such a way that it will yield when it strikes or is struck by an object, and will serve as an effective protection to the car and to the person or thing which comes in contact with it. Our invention is also intended to produce a bumper of this kind in which the yielding of the resilient guard member will surely close an electric circuit which can include any car or signal controls which are electrically operated or governed. Our invention is also intended to improve car bumpers in various details which will be hereinafter described and pointed out in the claims.

Reference is to be had to the accompanying drawings forming a part of this specification, in which similar reference characters indicate corresponding parts in all the views.

Figure 1 is a plan view of the bumper embodying our invention.

Figure 2 is a face view thereof.

Figure 3 is a sectional plan.

Figure 4 is a cross section on the line 4—4 of Figure 3.

Figure 5 is a cross section on the line 5—5 of Figure 3.

Figure 6 is a broken plan view of the bumper as slightly modified to make it applicable to the rear end of a car.

Figure 7 is a broken face view of the bumper shown in Figure 6.

Figure 8 is a sectional plan of the bumper shown in Figures 6 and 7.

Figure 9 is a cross section on the line 9—9 of Figure 8, and

Figure 10 is a broken perspective detail of the adjustable connection between the bumper and its supporting bracket.

Referring to Figures 1 to 5, the bumper is provided with a base 10 which serves as a back bone or stiffening member of the bumper, and this is a straight bar preferably of channel iron as this form enables the base to be light and strong, and at the same time serve as a protection for some of the parts within it. The bar or base may be of other shape, however, without affecting the invention. The base is adapted to be supported in front of a car so as to extend across the front like most bumpers, and the support is secure but preferably flexible and comprises a generally U shaped bracket 11 which is along its middle portion parallel with the bar 10, and is adapted to be secured to the car goose necks or other parts as usual. The end portions of the bracket 11 are flattened as at 12 and secured to the member 10 near its ends by bolts 13 or the like which also serve to fasten the end portion 14 of the guard 15, as these parts 12 and 14 can conveniently overlap. The guard 15 is spaced apart from the base 10, and its front portion lies substantially parallel with the base and its ends are looped around and spaced from the ends of the base as shown at 16, the terminal parts of the guard 14 being attached as already described. This makes a firm support and permits the guard to spring inward freely in case it contacts with an extraneous object, and the U shaped bends 16 give it all the necessary resilience and strength.

It will be noticed that the guard is in the form of a flat plate, and as it is held with its edge portion vertical, it is strong as well as resilient. In the drawings we have shown the guard 15 covered by a face plate 17 which has no particular function, but is simply to make the bumper ornamental, and in this connection attention is called to the fact that the bumper which we have shown and described is very neat and compact in appearance, and this is essential to its adoption for use on a motor car, as appearance is almost as important as utility.

As a further vertical support for the guard we employ bolts 18 which extend through the guard and base 10 as presently described, and thus prevent the guard from sagging, but do not interfere with its free horizontal movement. To this end the bolts are provided with flattened heads 19 which lie against the face of the guard or of the plate 17 which is really a part of the guard, and the rear ends of the bolts are provided with nuts 20. The rear ends also extend through insulating washers 21, and the bolts each extend through a tube 22 which is held at its ends in the guard 15 and in the base 10, being insulated from the base by a thimble 22'. The thimble 22' also carries a contact plate 23 which extends along the base 10 on the back thereof, and an insulating backing 23' is provided for the plate. The several tubes 22 are encircled by spiral springs 24 which tend to hold the guard 15 in its outward position, but when the latter is moved inward by contact with an object, it moves against the tension of the several springs 24 as well as against the tension of the bends 16.

The guard 15 carries a series of generally U shaped contacts 25 which are supported on the tubes 22 which extend through their middle portion, and the free end portions 26 are preferably curved slightly so as to make an easy and resilient contact with the plate 23 when the guard is moved inward. This closes the circuit between the member 23 and the guard and forms a ground connection. A plate 27 generally L shape is attached to the plate 23 and is insulated as shown at 28 from the bottom of the base 10 where it connects with a binding post 29. This can be connected with any conventional car control and signal apparatus so that when the guard 15 is moved inward it will form a ground connection and the circuit will be closed from the binding post through the plate 23 and contacts 25.

In Figures 6 to 10 we have shown a structure which is like that already described except for some slight modifications of shape to better adapt the structure for use on the rear end of a car. As here illustrated the base 10 has its end portions curved and somewhat extended as shown at 10', and the bends 16' are correspondingly shaped so as to be properly spaced from the base, and this shape enables the bumper to extend further around the sides of the car, as it is more likely to be struck from the side than is the front bumper. Otherwise the structure is substantially as already described except for its means of support, and with the further exception that additional contacts 25' are provided. The means of supporting must be varied somewhat to adapt it to the ordinary rear construction of a car. Here instead of the bracket 11, the bumper has inwardly curved arms 30 which have a sliding or adjustable connection 31 with the bracket 32 on the car. The arms 30 and bracket 32 connect by a sleeve 33, and the overlapping parts are slotted as at 34 and fastened in the desired position by a bolt 35 which extends through the slots. Obviously the bumper might be supported in other ways if the car construction required it in order to bring it into correct position at the rear of the car.

From the foregoing description it will be seen that we have produced a strong, simple, resilient bumper which can be easily applied, which serves its intended purpose well, and is neat and compact in appearance.

We claim:—

1. A car bumper comprising a base bar, a resilient bracket extending lengthwise of the bar attached thereto at the end portions and adaped for attachment to a car, and a guard member spaced apart from and extending generally parallel with the base, the end portions of the guard member being formed into loops extending around and spaced from the ends of the base, the terminals of the guard member being secured to the back of the base.

2. A bumper comprising a base bar member, means for supporting said member on a car, a guard spaced from and extending generally parallel with the base, said guard being looped around and free of the ends of the base and attached to the base back, and spring members arranged between the body portions of the base and guard.

3. A car bumper comprising a base bar, a guard spaced from and extending generally parallel with the base, the guard having bends at its end portions extending around and free of the ends of the base, the guard having its terminals attached to the back of the base, guide elements extending from the guard and sliding through the base, and spiral springs around the guide elements.

4. A car bumper comprising a base bar, a resilient bracket connected to the bar near its end portions and adapted for attachment to a car, a guard spaced apart from and generally parallel with the base, said guard being looped around the base ends and attached to the back of the base, a common fastening for the ends of the bracket and the terminals of the guard, and springs disposed between the guard and base.

5. A car bumper comprising a base bar adapted to extend across the car end, means for supporting the base on a car, a guard spaced from and generally parallel with the base, said guard being looped around and spaced from the base with its terminals attached to the back of the base, springs between the guard and the base, and circuit closing contacts carried by the guard and contacting with a complementary part on the base.

6. A car bumper comprising a channel iron base bar, means for supporting the base bar on a car, a guard spaced from and generally parallel with the base, said guard being looped around the base ends out of contact therewith and with its terminals attached to the back of the base, spring members between the guard and base, a contact plate on the base having connection with a binding post, and contacts on the guard adapted to contact with the aforesaid plate when the guard is moved towards the base.

In testimony whereof, we have signed our names to this specification this 10th day of October, 1927.

KARL O. SCHAUMAN.
STIRLING R. YANCEY.
JOSE L. MIFSUD.